Aug. 14, 1962 R. M. SHANNON 3,049,626

SPECTRUM GENERATOR

Filed May 2, 1961

INVENTOR.
RAYMOND M. SHANNON.
BY Alden D. Redfield,
Irwin P. Garfinkle
ATTORNEYS.

United States Patent Office 3,049,626 Patented Aug. 14, 1962

3,049,626
SPECTRUM GENERATOR

Raymond M. Shannon, Cincinnati, Ohio, assignor to Avco Corporation, Cincinnati, Ohio, a corporation of Delaware Filed May 2, 1961, Ser. No. 107,104
8 Claims. (Cl. 307—88.5)

This invention relates to multiple signal generators, and more particularly to clock driven transistor circuitry for providing a wide band frequency spectrum related harmonically to the clock frequency.

None of the known prior art proved capable of supplying a reference frequency signal with high order of stability and relatively low amplitude loss over a spectrum sufficient to satisfy the needs of a single side band receiver. As reduced to practice, the present invention is capable of generating signals of usable amplitude over a broad spectrum of frequencies over a range through the 50th harmonic. These results were accomplished by means of novel transistor-diode circuitry provided by the combination of super-regeneration and semi-conductor diode amplification.

The primary object of this invention is to provide a system for generating high order harmonic signals with usable amplitudes from a stabilized fundamental frequency.

Another object of this invention is to provide a system of frequency multiplication having improved conversion efficiency, low order energy in unused harmonics, improved and simplified filtering, miniaturized and simplified spectrum generation with transistorized circuitry, and a harmonic sequence approximately adhering to the $$\frac{\text{sine } X}{X}$$

amplitude envelope.

For further objects and for a better understanding of the precise nature of this invention, reference should now be made to the following complete detailed specification and to the accompanying drawing in which.

Figure 1:
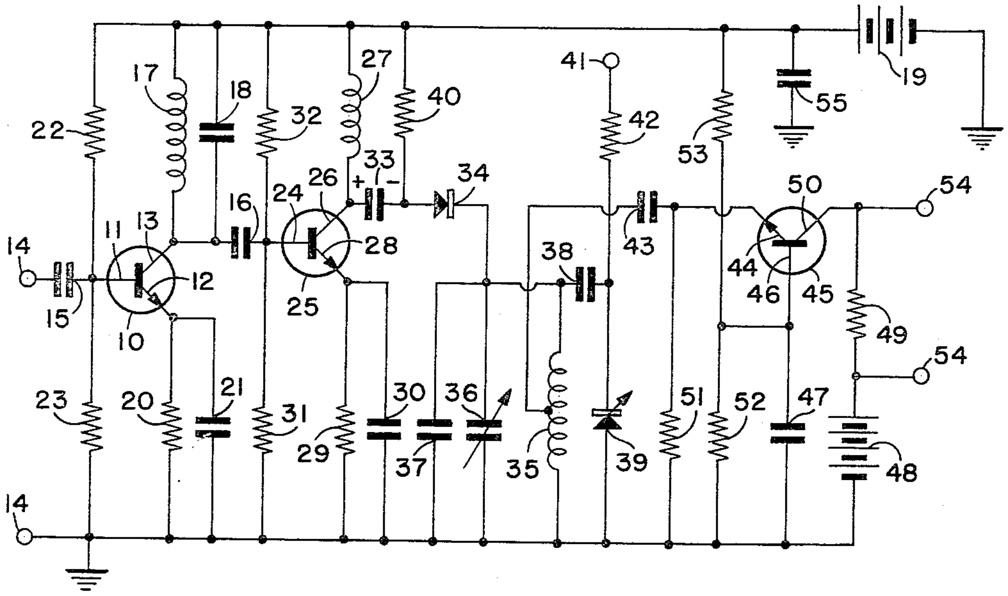
FIG. 1 illustrates a preferred embodiment of this invention.

The spectrum generator illustrated in FIG. 1 includes a tuned N-P-N transistor amplifier 10 having a base 11, an emitter 12, and a collector 13. A fundamental frequency signal from the system clock (not shown) is applied at terminal 14 through capacitor 15 to the base 11, and the amplified fundamental is derived from the collector 13 through a capacitor 16, the collector 13 being tuned to the fundamental frequency by a tank circuit including an inductor 17 and a capacitor 18. Operating bias for the transistor electrodes is provided by a connection from the positive terminal of a battery 19 to the collector 13 through inductor 17 and by a connection from the negative terminal to the emitter 12 through resistor 20, the resistor 20 being by-passed for alternating currents by means of a capacitor 21. Fixed direct current bias for the base 11 is provided at the junction of resistors 22 and 23. The battery 19 is by-passed for alternating currents by a capacitor 55.

The amplified fundamental frequency signals are coupled from the collector 13 through the capacitor 16 to the base 24 of an N-P-N transistor 25. The collector 26 of transistor 25 is connected to the positive terminal of the battery 19 through an inductor 27, and the emitter 28 is connected to the negative terminal through a resistor 29 which is by-passed for alternating currents by a capacitor 30. The junction of resistors 31 and 32 provides a fixed direct current bias for the base 24.

Connected between the collector 26 and ground is a network including a capacitor 33, a semi-conductor diode 34, and a resonant filter network including an inductor 35, a variable capacitor 36, a fixed capacitor 37, capacitor 38, and a varactor 39. The diode 34 is biased in a forward direction by a connection to the positive terminal of battery 19 through resistor 40, while variable direct current controlled voltages for the varactor 39 are supplied from another direct current source at terminal 41 through a resistor 42. The resonant filter network is tuned to the desired harmonic, which may be within a range through the 50th depending upon the particular parameters and circuit requirements, by varying the capacity of the varactor 39 in accordance with the voltage at terminal 41.

The output from the resonant filter is derived from a tap on the inductor 35 and applied through a capacitor 43 to the emitter 44 of an N-P-N transistor amplifier 45, the base 46 of transistor 45 being connected to ground for the harmonic frequencies by means of a capacitor 47. Bias for the electrodes of the transistor 45 is provided by a battery 48 through a resistor 49 connected to the collector 50 and a resistor 51 connected to the emitter 44. Fixed base bias is provided at the junction of resistors 52 and 53. The output from the transistor 45 is developed across the resistor 49 at terminals 54.

Figures 2, 3, 4:
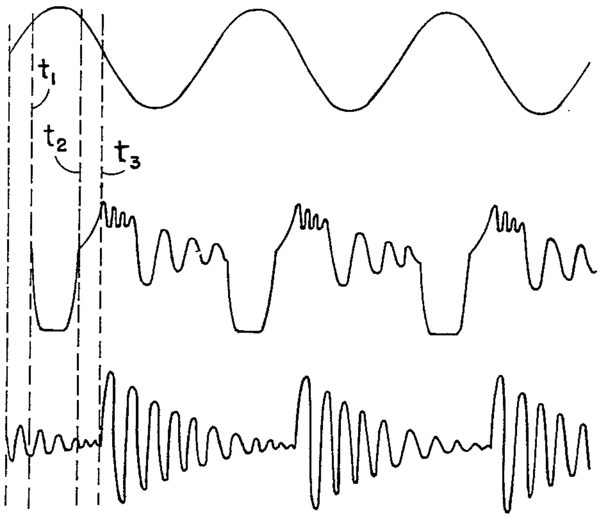
FIGS. 2 through 4 are a series of curves illustrating the operation of the circuitry.

The operation of the system of FIG. 1 will now be discussed in connection with the operating curves of FIGS. 2, 3, and 4, all drawn on the same time scale. A sine wave of a given fundamental frequency is applied at the terminals 14 across the base-emitter junction of the transistor amplifier 10, and the output derived at the collector 10 is applied across the base emitter junction of transistor 25. The input wave shape of the signal applied across the base-emitter junction of transistor 25 is shown in FIG. 2. The transistor amplifier 10 is a fixed gain amplifier with characteristics such that the output signal strength is sufficient to drive the transistor 25 into hard forward conduction so that collector saturation is realized over part of the cycle, and then driven into cutoff over a part of the cycle.

Prior to the application of a signal to the base 24, the transistor 25 is cut off and the plates of the capacitor 33 are charged with polarities, as shown in FIG. 1, essentially to the potential of battery 19. Upon the application of the positive half cycle of the sine wave of FIG. 2 across the base-emitter junction of transistor 25, heavy conduction through the collector-emitter junction results at time $t_1$ and continues until time $t_2$. During this period the battery 19 is impressed across the inductor 27, the collector-emitter junction, the resistor 29, and capacitor 30. It will be noted that during the period $t_1$—$t_2$, the capacitor 33 discharges to some extent through the collector-emitter junction of transistor 25, through capacitor 30, the resonant filter network, and in the reverse direction through the forward biased diode 34 thereby cutting off that diode.

After the transistor is driven into the cutoff region, conduction through the collector-emitter junction ceases. At this point the capacitor 33 will charge to battery potential and the diode 34 will again be forward biased at time $t_3$ when the inductor 27, in which energy has previously been stored, will ring and discharge through the capacitor 33 and the diode 34 in the forward direction into the resonant network including the inductor 35, the capacitors 36, 37, and 38, and the varactor 39. The voltage appearing at the collector 26 of transistor 25 is shown in FIG. 3 and the output from the diode 34 is illustrated in FIG. 4. It is noted that the reactive parameters in the circuit of collector 26 are designed for natural resonance well above the fundamental frequency, and the self-resonant tank inductor 27 is resistance loaded to provide the right order of circuit Q for the proper decrement of this controlled quenching or blocking oscillator.

It will be understood that what has been produced is a circuit in which a transistor performs in a self-regenerative manner monitored by the fundamental frequency input signal; that is to say, the transistor 25 conducts for a period of time and then is quenched or cut off for a period of time determined by the fundamental frequency. During the period of quenching, the previously charged inductive element in the collector circuit of transistor 25 is discharged in a ringing fashion through the diode 34 and through the resonant filter network. During the period of conduction, the forward bias on the diode 34 is reversed by the discharging of capacitor 33. When this charge is restored by the discharging inductor 27, the subsequent ringing of the resonant filter network results with $$\frac{\text{sine } X}{X}$$

characteristics at the collector of transistor 25. The tuning of the resonant filter by means of the varactor diode 39 to a particular frequency provides a load for the diode at that frequency and hence, the desired frequency is diode amplified by the diode 34 to further enhance the system performance.

For the purpose of enabling persons skilled in the art to reconstruct this invention, the circuit parameters used in an embodiment of this invention as reduced to practice are reproduced as follows:

| | |
|---|---|
| Transistor **10** | Type 2N706. |
| Transistor **25** | Type 2N706. |
| Transistor **45** | Type 2N706. |
| Diode **34** | Type 1N663. |
| Diode **39** | Type EC1006. |
| Resistor **20** | 470 ohms. |
| Resistor **22** | 8.2K ohms. |
| Resistor **23** | 2.2K ohms. |
| Resistor **29** | 470 ohms. |
| Resistor **31** | 2.2K ohms. |
| Resistor **32** | 8.2K ohms. |
| Resistor **40** | 68K ohms. |
| Resistor **42** | 100K ohms. |
| Resistor **49** | 12K ohms. |
| Resistor **51** | 470 ohms. |
| Resistor **52** | 2.2K ohms. |
| Resistor **53** | 8.2K ohms. |
| Inductor **17** | .5 mh. |
| Inductor **27** | .5 mh. |
| Inductor **35** | 4 $\mu$h. |
| Capacitor **15** | .1 $\mu$f. |
| Capacitor **16** | .1 $\mu$f. |
| Capacitor **18** | 5100 $\mu\mu$f. |
| Capacitor **21** | .1 $\mu$f. |
| Capacitor **30** | .1 $\mu$f. |
| Capacitor **33** | .5 $\mu$f. |
| Capacitor **36** | .8–8.5 $\mu$f. |
| Capacitor **37** | 270 $\mu$f. |
| Capacitor **38** | .01 $\mu$f. |
| Capacitor **43** | .01 $\mu$f. |
| Capacitor **47** | .01 $\mu$f. |
| Capacitor **55** | 3.33 $\mu$f. |
| Battery **19** | 16 volts. |
| Battery **48** | 16 volts. |
| Voltage at terminal **41** | 3.965–47 volts. |

It is to be understood that the foregoing parameters are in no way limiting upon the nature or scope of this invention but are illustrative of a practical embodiment. Furthermore, it will be apparent that many modifications and adaptations will be available without departure from the spirit of the invention. Therefore, the invention should be limited only by the appended claims as interpreted in the light of the prior art.

What is claimed is:

1. In a system for generating selected frequencies in a broad band of frequncies harmonically related to a given fundamental frequency, the combination comprising: a source of direct currents; an inductor; an electronic valve; means connecting said inductor and said valve in series across said source; a capacitor connected to the junction of said valve and said inductor; a semiconductor diode; a resonant load tuned to a desired harmonic in said band; said semi-conductor diode and said resonant load being connected in series with said capacitor and said inductor across said source; means for forwardly biasing said diode and means for rendering said electronic valve conductive and non-conductive at a rate equal to said fundamental frequency.

2. The invention as defined in claim 1 wherein said electronic valve comprises the emitting and collecting electrodes of a current flow control device, said device also having a control electrode; and wherein said means for rendering said valve conductive and non-conductive comprises a source of alternating current signals applied to said control electrode.

3. The invention as defined in claim 1 wherein said capacitor and said inductor are series resonant at a frequency intermediate said harmonic frequency and said fundamental frequency.

4. In a system for generating a broad band of frequencies harmonically related to a given fundamental frequency, the combination comprising: a source of fundamental frequency signals; a current flow control device having a collecting electrode, an emitting electrode and a current flow control electrode; a two-terminal source of biasing potential; connections from said source to said electrodes for operatively biasing said electrodes, said device being non-conductive in the absence of said fundamental frequency signals applied to said control electrode; means connecting said source of fundamental frequency signals to said control electrode, said signals being of sufficient amplitude to render said device conductive over at least a portion of one-half cycle; one of said connections from said source including an inductor connected between one terminal of said source and said collecting electrode; a capacitor connected to the junction of said inductor and said collecting electrode; a semiconductor diode and a network tunable over said broad band of frequencies, said capacitor, said diode and said network being connected in series between said collecting electrode and the other terminal of said source; and means forwardly biasing said diode.

5. The invention as defined in claim 4 wherein said current flow control device is a transistor.

6. The invention as defined in claim 4 wherein said inductor and capacitor are series resonant at a frequency intermediate said fundamental frequency and said band of harmonic frequencies.

7. In a system for generating selected frequencies in a broad band of frequencies harmonically related to a given fundamental frequency, the combination comprising: a source of fundamental frequency signals; a first transistor having base, emitter, and collector electrodes; a two-terminal source of direct currents; a network tuned to said fundamental frequency connected between one terminal of said source and said collector electrode; a parallel connected emitter-resistor and capacitor connected between said emitter electrode and the other terminal of said source; first and second resistors connected in series between the terminals of said source, said base electrode being connected to the junction of said resistors for establishing a high fixed gain operation for said first transistor; means connecting said source of fundamental frequency signals between said base electrode and said other terminal; a second transistor having second base, emitter, and collector electrodes; an inductor connected between said one terminal and said second collector electrode; a parallel connected emitter-resistor and capacitor connected between said second emitter and said other terminal; third and fourth resistors series connected between said terminals, said second base being connected to the junction of said third and fourth resistors for establishing high fixed gain operation for said transistor; means coupling the collector electrode of said first transistor to the base of said second transistor for fundamental frequencies; a capacitor connected to the junction of the collector of said second transistor and said inductor, said inductor and capacitor being series resonant at a frequency intermediate said fundamental frequency and said broad band of frequencies; a semi-conductor diode; a resonant tank circuit tunable over said broad band of frequencies, said semi-conductor diode and said resonant tank circuit being connected in series with said capacitor and said inductor between said terminals; and means for forwardly biasing said semi-conductor diode.

8. The invention as defined in claim 7 wherein said resonant tank circuit includes a voltage sensitive reactance device, and wherein a variable voltage source is provided for varying the reactance of said device to tune said network to a selected harmonic frequency.

No references cited.